Figure 4:
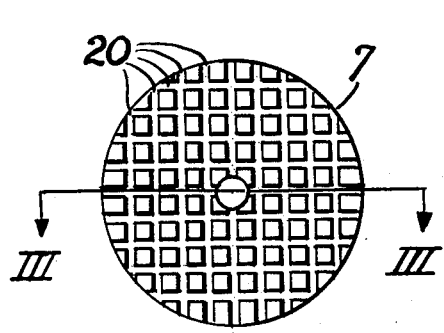

Nov. 18, 1952 W. J. LEAS 2,618,151
CELL FOR MEASURING RELATIVE PERMEABILITY
Filed Oct. 7, 1948 2 SHEETS—SHEET 1

William J. Leas Inventor
By W. O. T. Hilman Attorney

Nov. 18, 1952 W. J. LEAS 2,618,151
CELL FOR MEASURING RELATIVE PERMEABILITY
Filed Oct. 7, 1948 2 SHEETS—SHEET 2

William J. Leas Inventor
By W. O. Heilman Attorney

Patented Nov. 18, 1952

2,618,151

UNITED STATES PATENT OFFICE 2,618,151

CELL FOR MEASURING RELATIVE PERMEABILITY

William J. Leas, Tulsa, Okla., assignor to Standard Oil Development Company, a corporation of Delaware Application October 7, 1948, Serial No. 53,352

2 Claims. (Cl. 73—38)

1

This invention relates to an apparatus for determining the relative permeability of earth formations to gases and liquids, and more particularly relates to a unique type of cell for holding an earth or rock sample for the purpose of making such measurement of relative permeability.

During the drilling of wells and in the course of prospecting for oil, core samples of the earth formations traversed are taken to determine the nature thereof. From the measured permeability of a reservoir rock it is possible for a petroleum engineer to calculate with some degree of accuracy the rate at which the oil well may produce.

Heretofore measurements of permeability of rock samples to various fluids have been made by mounting the test specimen in a suitable holder and measuring the rate of fluid flow through the specimen under various pressure gradients. However, with the procedures employed it is possible to measure the permeability with only one fluid at a time. It is often desirable to know what the probable flow rate of one fluid through the rock will be in the presence of a second fluid or, in other words, what the relative permeability of the rock is to one fluid with respect to the concentration of that fluid in the rock. Since it is not possible to calculate this from observed measurements of permeability to individual fluids as determined by prior procedures it is highly desirable to have a method of making actual measurements of permeability to one fluid in the presence of a second fluid. Knowledge of the relative permeability of an oil bearing stratum with respect to the fluid concentration in that stratum is of considerable importance in the study of oil reservoirs since it gives the engineer valuable information regarding the behavior of fluids in flow. This information is of considerable help in determining just how rapidly a fluid will flow through a formation under the conditions present therein.

It is an object of the present invention to provide a simple apparatus for determining the relative permeability of an earth formation to a plurality of fluids by appropriate tests on a sample core taken from the formation in question. Other and further objects of this invention will be apparent from the ensuing description and from the accompanying drawings.

Briefly, this invention relates to an improved apparatus for determining the relative permeability of a core sample to gas and oil and to a cell for accomplishing this purpose. Essentially, this cell comprises rigid non-porous end walls, a flexible non-porous side wall, porous discs adapted to be placed at each end of the rock sample contained in the cell, non-porous discs adapted to be placed in the cell between the porous discs and the end walls of the cell, means for conducting one fluid into the cell into direct contact with the core sample, means for conducting a second fluid to the exterior side of one of the porous discs and means for removing fluid from the cell.

Figure 6:
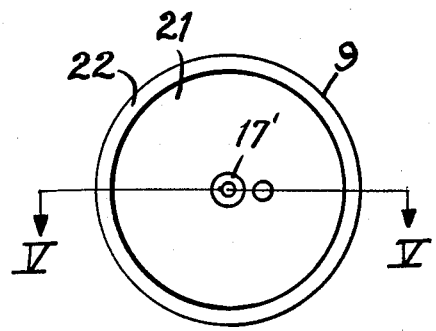
Figure 3:
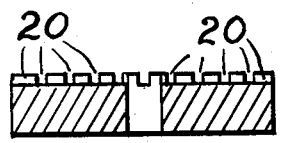
Figure 5:
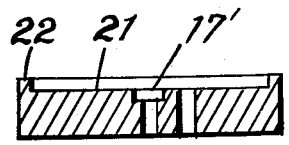
Figure 1:
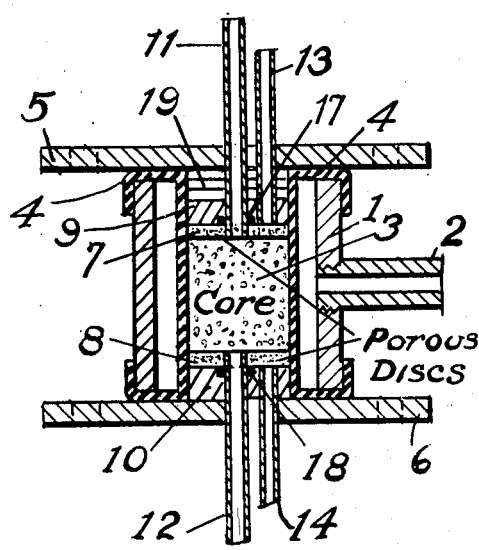
Figure 2:
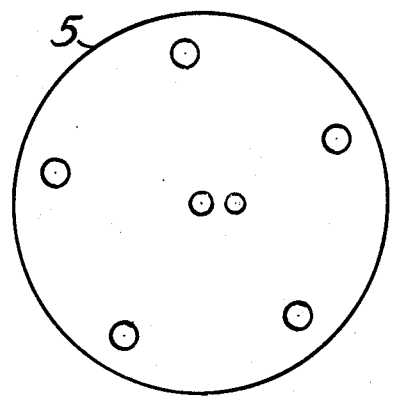
Figure 7:
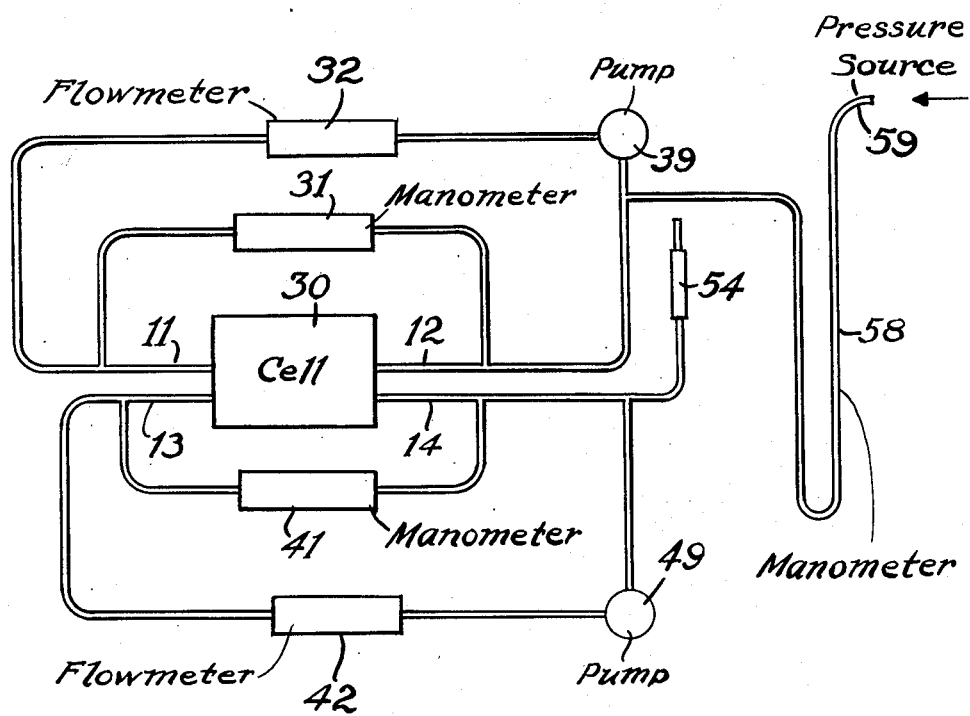

In the drawings, Fig. 1 represents a cross section view of one embodiment of an assembled cell according to the present invention. Fig. 2 depicts a top view of one of the end plates of the cell shown in Fig. 1. Figs. 3 and 4 show details of one design that may be employed for the porous and/or non-porous discs of Fig. 1. An alternative design of non-porous disc is shown in Figs. 5 and 6. Fig. 7 presents a schematic diagram of a complete assembly of apparatus for determining relative permeability when employing the improved sample cell of the present invention.

Referring particularly to Fig. 1, numeral I refers to a barrel member, which is preferably of cylindrical form, having a lateral outlet tube 2. Fitted into the interior of the barrel member is a rubber sleeve 4 which laps over the ends of the barrel member. At each end of the barrel and sleeve assembly are placed end plates 5 and 6 which thus constitute the top and bottom of the assembled cell. These plates are preferably circular in shape although square or rectangular shapes may also be used. Each of these plates has a plurality of flow tube openings into which may be fitted flow tubes 11, 12, 13 and 14. These end plates may also have a number of holes for receiving bolts for the purpose of holding the assembled cell together. The barrel member and end plates are preferably made of metal.

Disposed within the cylindrical opening formed by the elastic sleeve 4 inside of barrel member I are porous discs 7 and 8 having openings adapted to receive the ends of flow tubes 11 and 12 respectively. Porous discs 7 and 8 are adapted to hold between them a rock sample or core 3 which is to be subjected to test. Lying within the cell between porous disc 7 and end plate 5 and immediately adjacent to porous plate 7 is a non-porous backing disc 9 which is provided with openings for receiving flow tubes 11 and 13. Similarly, non-porous disc 10 is placed between porous disc 8 and end plate 6 and has holes adapted to receive flow tubes 12 and 14. It will be seen that porous discs 7 and 8 and non-porous backing discs 9 and '0 are of substantially the same diameter as core 3. Flow tubes 11 and 12 may be cemented in place in porous discs 7 and 8 or they may be held in place with washers or O-ring gaskets 17 and 18 which may be made of rubber or similar elastic material. When the latter washers are used, suitable grooves are provided in backing discs 9 and 10 for holding these washers or gaskets.

In the assembled apparatus flow tube 11 is inserted through the appropriate openings in end plate 5, backing disc 9, and porous disc 7 so that it will terminate substantially flush with the inner surface of porous disc 7. Likewise, flow tube 12 is inserted through the appropriate openings in end plate 6, backing disc 10 and porous disc 8 in the same manner. Flow tube 13 is inserted through its appropriate opening, in end plate 5 and backing disc 9 so that it terminates substantially flush with the outer surface of porous disc 7. In the same manner flow tube 14 is inserted through appropriate openings in end plate 6 and backing disc 10 to terminate with the outer surface of porous disc 8. Tubes 11 and 13 and 12 and 14 are preferably soldered to plates 9 and 10 respectively when these latter are made of metal, which is the preferred material. If non-metallic plates 9 and 10 are used the various tubes may be held in place with a suitable cement. In order to provide for a snug fit of porous discs 7 and 8 against the ends of core sample 3, elastic washers 19 may be inserted between the backing disc 9 and end plate 5. Such a snug fit is desirable so that porous discs 7 and 8 will be pressed against the ends of core sample 3 with sufficient force to establish the proper amount of capillary contact. The use of the elastic washers 19 has the further advantage of correcting any lack of parallelness in the two ends of the core sample.

Fig. 2 presents a top view of end plate 5 of Fig. 1 and shows a suggested distribution of flow tube holes and also of holes for receiving bolts to hold the assembled cell together. Corresponding holes will, of course, be drilled in the opposite end plate 6 when the cell is to be held together by this means. For mechanical reasons, an odd number of bolt holes is usually preferred. Alternatively, the assembled cell could be held together without the use of bolts by placing it in a vise or similar clamping mechanism.

The porous discs 7 and 8 may have plane flat faces as shown in Fig. 1 or they may be designed with grooves to facilitate flow of fluids. Fig. 4 presents one form of porous discs that may be employed in the cell of this invention and, in the particular embodiment shown, presents the side of disc 7 that will be immediately adjacent the core sample in the assembled cell. In this figure are shown rectangular grooves 20 which direct the flow of fluid toward the opening adapted to receive flow tube 11. Fig. 3 shows the same disc in cross section through the line III—III of Fig. 4.

The same design can be used for backing disc 9 in which event an extra hole will be provided for tube 13. Another design for backing disc 9 is shown in Figs. 5 and 6, Fig. 5 being a cross-sectional view along line V—V of Fig. 6. A large portion of the side of the disc facing the porous disc 7 may be depressed or countersunk as indicated by reference numeral 21, leaving sufficient shoulder 22 to support disc 7. The narrow diameter groove 17' is designed to receive rubber ring 17 which seals flow tube 11 of Fig. 1.

As to the practical dimensions of the permeability cell these may be of any suitable magnitude and it is, of course, not intended that the invention be limited in any manner by the size of the cell employed. Normally, however, the cell will be constructed to accommodate a core of about an inch to an inch and one-half in diameter and up to about three inches in length. Ordinarily a core of about one inch diameter and one inch in length will be employed. The usual practice in coring a formation is to cut a core of from about one-half inch to about four inches in diameter. For the purpose of permeability measurements a smaller core or plug will be cut from the larger core in such a manner that the longitudinal axis of the small plug will be parallel to the bedding plane of the formation from which the original core was removed. The reason for this is that normally it is desired to measure the horizontal permeability of the formation.

The metal parts of the cell can be fabricated from any suitable material such as steel, brass or aluminum. The flow tubes 11, 12 etc. can be made of either metal, glass or plastic, although metal is the more practical. A convenient size for these tubes is about 1/8 inch outside diameter. With respect to the porous plates or discs 7 and 8, these may be of about 1/8 inch to 1/4 inch thickness and are ordinarily fabricated from ceramic material. The pores of the plates should have a radius from 0.1 to about 10 microns and the most useful range of pore radii will be found to be from about 1 to about 6 microns. If the pore size is too large a proper pressure differential between the two fluids in the cell cannot be readily maintained. On the other hand if the pore size is too small the permeability of the porous disc will be reduced to the point that no appreciable quantity of liquid can be made to flow through them.

In assembling the cell the core can be inserted most conveniently by evacuating the annular space between core barrel 1 and elastic sleeve 4, thus causing the sleeve to be held against the inside of the barrel by atmospheric pressure. After the cell has been assembled with the core in place, pressure can be applied to the sides of the core 3 by introducing a liquid through tube 2 into the annular space between the barrel 1 and the elastic sleeve 4. A liquid which does not react with the barrel 1 or the sleeve 4 is employed for this purpose in order to minimize diffusion of gases through the elastic sleeve. Mercury is one suitable liquid for this purpose.

In Fig. 7 is presented a diagram of a complete setup of apparatus for employing the sample cell of the present invention in the determination of relative permeabilities.

In this figure the assembled cell of Fig. 1 is indicated by reference numeral 30 and the flow tubes 11, 12, 13 and 14 by the same numerals as in Fig. 1. Flow tubes 13 and 14 are connected by suitable flow lines to manometer 41. Flow tube 13 is connected by another flow line to one side of flowmeter 42. The other side of flowmeter 42 is connected to pump 49 which in turn is connected through a flow line to tube 14. Connected to the latter flow line between tube 14 and pump 49 is a calibrated tube 54.

In similar manner flow tubes 11 and 12 are connected to manometer 31 and to flowmeter 32 and pump 39. The line leading from flow tube 12 to pump 39 is connected by suitable means to manometer 58. One leg of manometer 58 is connected to a source of pressure 59.

For the purposes of illustration, the portion of the system in Fig. 7 which embraces pump 49, manometer 41 and flowmeter 42 will be designated as phase A, which is a liquid phase. Likewise portion of the system embracing pump 39, manometer 31 and flowmeter 32 will be designated as phase B, which is a gas phase. In order to simplify the description of the operation still further, water will be employed to illustrate phase A and air to illustrate phase B. In using the apparatus the core 3 and the two porous discs 7 and 8 are the first saturated with water and then placed in the permeability cell, employing the technique described above for inserting the core. Then air pressure (capillary pressure) is applied from pressure source 59 sufficient to displace a portion of the liquid from the core, this pressure being measured by manometer 58. For example, 3 pounds per square inch will displace about 20 per cent of the water. Calibrated tube 54 can be used for measuring the amount of liquid thus displaced. Then pump 39 is placed in operation and regulated to give a pressure differential across the core of about 0.03 pound per square inch as measured by manometer 31. The amount of air flowing through the core under these conditions is then measured by flowmeter 32.

In the same manner, using the same pressure of 3 pounds per square inch from pressure source 59, the flow of liquid phase A through the core is determined by operating pump 49 to give a pressure differential across the core of about 0.03 pound per square inch as measured by manometer 41 and measuring the rate of flow of the liquid by means of flowmeter 42. Similar rates of flow for both gas and liquid are then obtained with greater pressures in the system from pressure source 59. To determine the relative permeability of the core to phase B at any given capillary pressure it is merely necessary to divide the rate of flow obtained with that pressure by the rate of flow obtained when the core is 100 per cent saturated.

Although water has been used to illustrate the operation of the apparatus the liquid or wetting phase A may be any other wetting fluid such as decane or a mineral oil. Likewise, the non-wetting phase B may be any gas such as air or natural gas or the like or it may also be a liquid. When measuring relative permeabilities with two fluid phases, phase A is always the phase which preferentially wets the core. Thus when water and oil are employed, water will be phase A and oil will be phase B, since the core will be preferentially wet by water. Likewise, oil will be the wetting phase with respect to gas.

By permitting the two phases to flow simultaneously in the same direction through the cell it is possible to simulate reservoir conditions in which oil and gas are flowing toward a well. Conditions existing in gravity drainage can be simulated by causing the two phases to flow in opposite directions through the cell.

Referring back to Fig. 1, the construction of the cell can be modified to some extent without departing from the basic principle of the invention. For example, in an alternative construction of the cell, tube 11 can be omitted, in which event backing disc 9 and end plate 5 will each be provided with one less flow tube opening and porous disc 7 will have no flow tube openings. In this modification of the invention, tubes 13 and 14 will serve as entrance and exit tubes for phase A. Phase B can then be introduced through tube 12. The procedure otherwise is substantially as has been described when using a cell having four tubes as indicated in Fig. 1. As phase B is introduced through tube 12 the core becomes partially saturated with phase B and the saturation with respect to phase A is correspondingly reduced. The percentage of phases A and B will be found to be a function of the differences in pressure of the two phases. This difference in pressure is maintained at a given value and the rate of flow of phase A is measured by means of a flowmeter as described in connection with Fig. 7. Similar measurements of rate of flow of phase A are obtained at other levels of pressure differences of phases A and B and from the information thus obtained one can calculate the relative permeability of the core to phase A as a function of the degree to which the core has been saturated by phase A.

Other related uses of the permeability cell of the present invention will occur to those skilled in this particular art and it is not intended that this invention be limited by the particular illustrations given but only by the following claims.

What is claimed is:

1. A cell for determining the relative permeability of a rock sample to a plurality of fluids which comprises a pair of end plates each provided with a plurality of flow tube openings, a barrel member held by the said end plates, an elastic sleeve inserted in said barrel member and defining therewith an annular space, the ends of said sleeves lapping over the ends of the barrel member; means for clamping together the assembly of said end plates, elastic sleeve and barrel member, a pair of porous discs disposed within the enclosure formed by said sleeve and said end plates and adapted to fit at each end of said enclosure so as to hold between them a cylindrical rock sample, at least one of said discs being provided with at least one flow tube opening, a pair of non-porous backing discs each adapted to be placed in said enclosure between one of said porous discs and one of said end plates, each non-porous disc being provided with at least one flow tube opening, said porous and non-porous discs having diameters substantially equal to that of said rock sample, a fluid inlet tube communicating with the annular space between said barrel member and said elastic sleeve adapted to conduct fluid into said annular space for the purpose of pressing said sleeve against the sides of said rock sample and against the edges of said porous and non-porous discs, and a plurality of flow tubes, at least one pair of which are adapted to pass through the flow tube openings in said end plates and in said non-porous backing discs so as to communicate directly with the exterior sides of said porous discs, and at least one flow tube being adapted to pass through flow tube openings in said end plates and in said non-porous backing discs so as to communicate directly with said rock sample.

2. A cell according to claim 1 having two pairs of flow tubes, one pair being adapted to pass through flow tube openings in said end plates, said non-porous discs and said porous discs so as to communicate directly with said rock sample, and the other pair being adapted to pass through flow tube openings in said end plates and in said non-porous discs so as to communicate directly with the exterior sides of said porous discs.

WILLIAM J. LEAS.

REFERENCES CITED

The following references are of record in the file of this patent:

UNITED STATES PATENTS

| Number | Name | Date |
| --- | --- | --- |
| 2,345,935 | Hassler | Apr. 4, 1944 |
| 2,465,948 | Welge | Mar. 29, 1949 |
| 2,534,718 | Leas | Dec. 19, 1950 |